US009674779B2

(12) United States Patent
Szabo et al.

(10) Patent No.: US 9,674,779 B2
(45) Date of Patent: Jun. 6, 2017

(54) METHODS FOR DECIDING WHEN TO SWITCH BETWEEN COMMUNICATION CHANNEL STATES, AND NETWORK NODES THEREFOR

(71) Applicant: TELEFONAKTIEBOLAGET L M ERICSSON (PUBL), Stockholm (SE)

(72) Inventors: Geza Szabo, Kecskemet (HU); Gergely Pongrácz, Budapest (HU); Mathias Sintorn, Sollentuna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/436,130

(22) PCT Filed: Oct. 16, 2012

(86) PCT No.: PCT/EP2012/070473
§ 371 (c)(1),
(2) Date: Apr. 16, 2015

(87) PCT Pub. No.: WO2014/060022
PCT Pub. Date: Apr. 24, 2014

(65) Prior Publication Data
US 2015/0282074 A1    Oct. 1, 2015

(51) Int. Cl.
*H04W 52/02* (2009.01)
*H04W 76/04* (2009.01)
(Continued)

(52) U.S. Cl.
CPC ....... *H04W 52/0209* (2013.01); *H04L 5/0044* (2013.01); *H04L 47/127* (2013.01);
(Continued)

(58) Field of Classification Search
CPC ..... H04W 52/0209; H04W 52/0225–52/0258; H04W 76/046; H04L 47/127; H04L 47/822; H04L 47/823; Y02B 60/50
See application file for complete search history.

(56) References Cited

U.S. PATENT DOCUMENTS 6,347,091 B1   2/2002   Wallentin et al.
8,699,441 B2   4/2014   Stjernholm et al.
(Continued)

FOREIGN PATENT DOCUMENTS

EP    2384081 A2    11/2011
WO    2008115108 A1    9/2008
WO    2011047260 A2    4/2011

*Primary Examiner* — Pao Sinkantarakorn
(74) *Attorney, Agent, or Firm* — Patents on Demand P.A.; Brian K. Buchheit; Scott M. Garrett (57) ABSTRACT

A method is carried out by a network node of a telecommunication network for deciding whether to change the state of a communication channel to a communication terminal. A characteristic of the traffic associated with the terminal is determined based on data collected in the network over a first time interval of length L. Then, based on the traffic characteristic, the traffic activity expected to be associated with the terminal during at least a second time interval of length L is predicted. The second time interval follows the first time interval. The network node then decides, based on the predicted traffic activity for the second time interval, whether to change the state of the communication channel. The invention also relates to a network node or set of network nodes for carrying such a method. The invention further relates to computer programs and computer program products.

33 Claims, 5 Drawing Sheets

(51) Int. Cl.
*H04L 12/801* (2013.01)
*H04L 5/00* (2006.01)
*H04L 29/06* (2006.01)
*H04W 88/02* (2009.01)

(52) U.S. Cl.
CPC ........... *H04L 69/16* (2013.01); *H04W 76/046* (2013.01); *H04W 88/02* (2013.01); *Y02B 60/50* (2013.01)

(56) References Cited

U.S. PATENT DOCUMENTS

| | | |
|---|---|---|
| 2005/0265294 A1* | 12/2005 | Hu .................... H04W 76/02 370/335 |
| 2012/0014326 A1 | 1/2012 | Dwyer et al. |
| 2012/0052814 A1 | 3/2012 | Gerber et al. |
| 2012/0122405 A1* | 5/2012 | Gerber .............. H04W 52/0232 455/67.11 |
| 2012/0195242 A1* | 8/2012 | Pyles ................ H04W 52/0251 370/311 |
| 2013/0100827 A1* | 4/2013 | Oliveira ............. H04W 76/046 370/248 |

* cited by examiner

METHODS FOR DECIDING WHEN TO SWITCH BETWEEN COMMUNICATION CHANNEL STATES, AND NETWORK NODES THEREFOR

CROSS REFERENCE TO RELATED APPLICATION(S)

This application is a 35 U.S.C. §371 National Phase Entry Application from PCT/EP2012/070473, filed Oct. 16, 2012, designating the United States, the disclosure of which is incorporated herein in its entirety by reference.

TECHNICAL FIELD

The present invention relates to methods aimed at deciding when to change the state of a communication channel associated with a communication terminal in a telecommunication system. The invention also relates to network nodes, as well as to computer program products and computer programs comprising computer-executable instructions configured, when executed on a network node, to cause the network node to carry out a method as mentioned above.

BACKGROUND

A protocol state of a communication channel between a network and a communication terminal, such as, but not limited to, a radio resource control (RRC) state of a communication channel, may significantly affect the energy consumption of the communication terminal as well as the load on the telecommunication system (notably in terms of radio resource usage, such as channel occupancy and therefore overall available bandwidth for all users). Indeed, each state may be associated with different procedures, rates of exchange of signalling information with the network, etc.

For example, in a system operating according to a High Speed Packet Access (HSPA) protocol, a channel may be in a RRC idle mode or in a RRC connected mode. In RRC idle mode, the user equipment (UE) is attached to the network but no data transfer occur. The RRC idle mode may be regarded as a channel state. In RRC connected mode, the channel may for example be in a CELL_DCH state (dedicated channel allocated for data transfer), a CELL_FACH state (common channel carrying the data), a CELL_PCH state (the UE can be paged, but must be switched to the CELL_FACH state for uplink data transfer) or a URA_PCH state. The meaning of these RRC states is known in the art and will not be repeated here. It suffices to mention that the power consumption associated with staying on these RRC states may significantly differ from each other. Typically, the power consumption of a UE in CELL_DCH state is approximately twice its consumption in CELL_FACH state and may be about fifty or a hundred times its consumption in CELL_PCH or URA_PCH state.

In fact, one reason for having originally introduced different channel states is to reduce the energy consumption of the UE. On the other hand, switching between channel states involves signalling, is thus also costly in terms of power consumption, and should consequently only occur when necessary and appropriate, i.e. when it is worth doing so. A trade-off needs to be found in that respect. The need for efficient channel switching procedures is particularly acute for packet-switched applications, such as for example TCP/IP-based applications. Indeed, although packet-switched applications may need to be "always-on", they in reality usually involve bursty, intermittent data transfers, rather than a continuous data transfer. The volume of packet traffic, mostly IP traffic, significantly increased in recent years with the introduction of smartphones and the like in the mobile network, and is still increasing as of today.

International application WO 99/66748, hereinafter referred to as reference [1], relates to a mobile communications system wherein one or more traffic parameters are determined for a connection (established between a mobile station and a radio access network), and then the traffic parameters are used to predict a future value of that parameter(s). The state of a connection is then changed to another state based the predicted parameter value or values. A traffic parameter used for prediction is the amount of data in queue for the connection (reference [1], page 11, lines 9-11). The time interval between packets (of a bursty flow of packets) may be used as parameter to decide what type of radio channel to use to bear the packet data connection (reference [1], page 4, lines 8-10 and 14-15). For example, reference [1], page 16, line 27 to page 17, line 3 discloses: "After a last amount of data to be sent is transmitted, (e. g., the transmit queue is empty), a predefined time period is monitored. If a new data packet is not received at the end of that predetermined time period, then the dedicated channel is released, and a new shared channel is allocated to the connection".

It is desirable to improve existing telecommunication systems involving channel state switching to further reduce the power consumption of communication terminals and to optimize radio resource usage, without increasing, or at least without excessively increasing, the implementation and architecture complexity and the associated equipment costs.

SUMMARY

To meet or at least partially meet the above-mentioned goals, methods, network nodes, computer programs, and computer program products according to the invention are defined in the independent claims. Advantageous embodiments are defined in the dependent claims.

In one embodiment, the method is carried out by at least one network node of a telecommunication network for deciding whether to change the state of a communication channel to a communication terminal, i.e. for deciding whether to change the state of a communication channel established between the network and the communication terminal. The method comprises a first procedure, a second procedure, and a third procedure, hereinafter referred to respectively as "determination procedure", "prediction procedure", and "decision procedure". The determination procedure comprises determining at least one characteristic of the traffic associated with the communication terminal, based on data collected in at least one point of the telecommunication network over a time interval of length L, said time interval being hereinafter referred to as "first time interval". The prediction procedure comprises predicting, based on the at least one characteristic (determined during the determination procedure), the traffic activity expected to be associated with the communication terminal during at least another time interval of length L, this other time interval being hereinafter referred to as "second time interval", wherein the second time interval follows the first time interval. The decision procedure then comprises deciding, based on the predicted traffic activity for the second time interval (predicted during the prediction procedure), whether to change the state of the communication channel.

The method of this embodiment is therefore a prediction-based method using, as input for the prediction, one or more traffic characteristics computed on a per time interval basis.

This reduces the high variance in the traffic characteristic(s), thus easing the prediction. This is especially the case for history-based predictions, wherein the traffic activity of a communication terminal is determined based on previous values of traffic characteristics. The inventors have recognized that the prediction-based method of the above-described embodiment, which is based on slicing the time into intervals of the same length for computing the inputs to the prediction, leads on average to more timely channel state switching, compared notably to the (inactivity) timer-based methods of the prior art (involving static timers initiated after the last burst, i.e. involved burst-triggered timers). Thus, communication terminals consume less power, leading in turn to increased battery lifetime, and the network resources are used more efficiently.

In other words, there is a certain cost for switching channel states, so that a switch to, for example, a lower channel state (such as, for example, from CELL_DCH to CELL_FACH) which is immediately followed by another burst is a waste of resources. Also, in the other direction (such as, for example, from CELL_FACH to CELL_DCH), it is desirable to foresee the time of the next burst to be able to switch the channel state accordingly. The method of the above-described embodiment at least partially achieves that goal using a prediction-based method involving segmenting the time, during which burst and silence periods occur, into equally long time intervals to produce more appropriate inputs for the prediction.

The invention also relates to a network node comprising functional units and/or computer-executable instructions configured for carrying out the above-mentioned method.

The invention also relates to computer program products and computer programs comprising computer-executable instructions configured, when executed on a network node or on a computer, to cause the network node or the computer to carry out a method according to any one of the above-described embodiments.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims.

Figure 1:
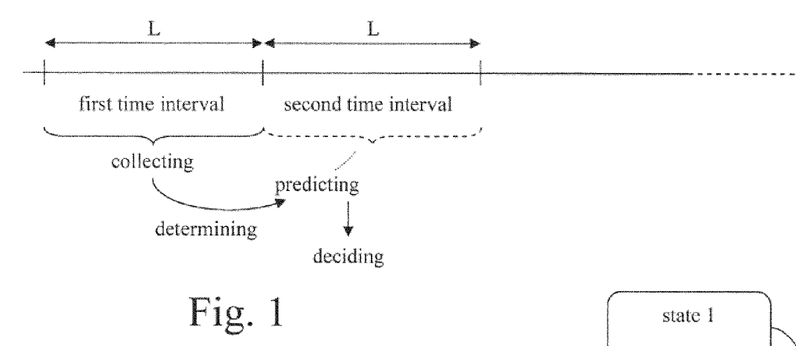
FIG. 1 illustrates, schematically and in a basic, logical manner, steps of a method in one embodiment of the invention.

FIG. 1 illustrates, schematically and in a basic, logical manner, steps of a method in one embodiment of the invention. A first time interval of length L is followed by a second time interval having the same length L. There is no gap between the first and second time interval. The time intervals of length L preceding or following the first and second time intervals are not depicted for the sake of clarity, although the method may be repeated for these successive time intervals. In at least one point of the telecommunication network, data is collected about the traffic associated with a communication terminal over the first time interval (as illustrated by the word "collecting" on FIG. 1). Then, based on the collected data, at least one characteristic of the traffic associated with the communication terminal is determined (as illustrated by the word "determining" on FIG. 1). The traffic characteristic(s) is used as input for the prediction (as illustrated by the word "predicting" on FIG. 1) aiming at predicting the traffic activity during the second time interval and, optionally, beyond. The predicted traffic activity is then used for deciding (as illustrated by the word "deciding" on FIG. 1) whether to switch the channel state of a communication channel between the communication terminal and a network (such as for example, a radio access network, a core network, both the radio access network and core network, or any other operator-controlled network or combination thereof).

In one embodiment, the method is used when the communication channel is in a particular state, such as for example in CELL_DCH state, and the method is not used when the communication channel is another state, such as for example in CELL_FACH state (a traditional inactivity timer may be used instead for that state). In another embodiment, the method is used for all state transitions. In yet another embodiment, the method is used for deciding some state transitions whereas inactivity timers are used for other state transitions. Whether to use the method for a specific state transition may also be configurable by the network operator.

This means that, after the decision procedure, if switching the channel state has been decided and carried out, the method may either be interrupted or may continue in the new channel state, depending on the embodiments.

Figure 2:
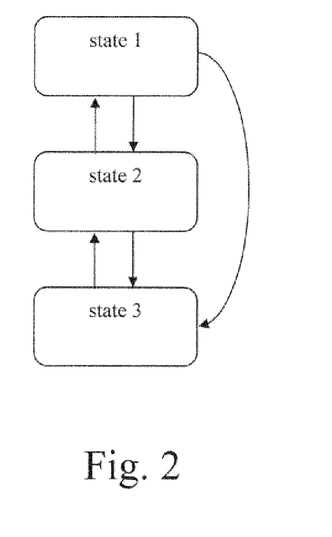
FIG. 2 is a state diagram involving three exemplary states, which may be involved in one embodiment of the invention.

FIG. 2 is an exemplary state diagram involving three states, namely state 1, state 2, and state 3, which may be involved in one embodiment of the invention. A communication channel between a communication terminal of a subscriber and the network may be in any of these three states, and depending on the state of the channel, different procedures apply, wherein these different procedures may lead to different power consumption and network resource usage (i.e., load). For example, state 1 may cause the UE to consume more power than state 2, and state 2 may in turn cause the UE to consume more power than state 3. The embodiment of the invention aims at deciding when to switch the channel state from one state to another, keeping in mind that the actual switching from one state to another involves the exchange of signalling information and is thus costly.

As mentioned above, in some embodiments, the method may be used for deciding whether to carry out certain state transitions (for example whether to switch from state 1 to state 2 and whether to switch from state 2 to state 3). The method need not be used for all state transitions, although the method may be used for all state transitions. In one embodiment, the method is used for all state transitions to a lower energy state.

Figure 5:
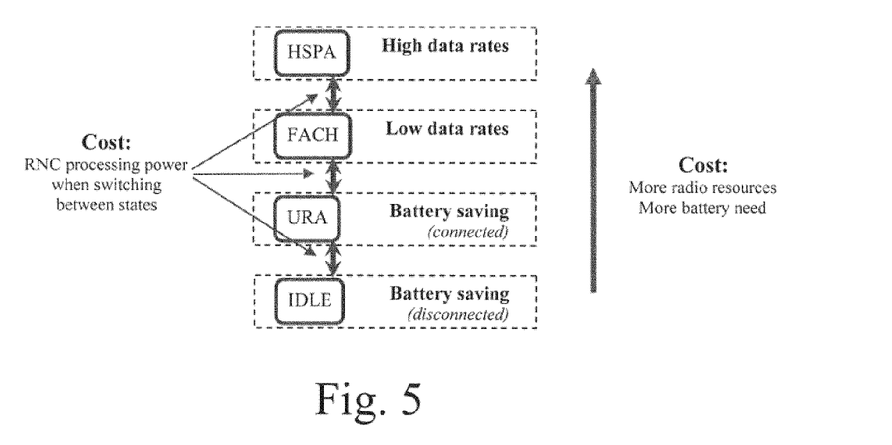
FIG. 5 is another exemplary state diagram which may be involved in one embodiment of the invention.

FIG. 5 is another, more specific example of a state diagram which may be involved in one embodiment of the invention. The state diagram involves four states, namely a so-called "HSPA" state (such as a CELL_DCH state as mentioned above), a so-called "FACH" state (such as a CELL_FACH state as mentioned above), a so-called "URA" state (such as a URA_PCH state as mentioned above), and a so-called "IDLE" state. The HSPA state is for supporting high data rates, the FACH state is for supporting lower data rates, the URA state is for battery saving in connected mode, and the IDLE state is for battery saving in disconnected mode. The higher the state on FIG. 5, the more radio resources and battery are consumed (as illustrated by the words "Cost: More radio resources, More battery need"). Furthermore, the switching between states consumes resources (as illustrated by the words "Cost: RNC processing power when switching between states").

Figure 3:
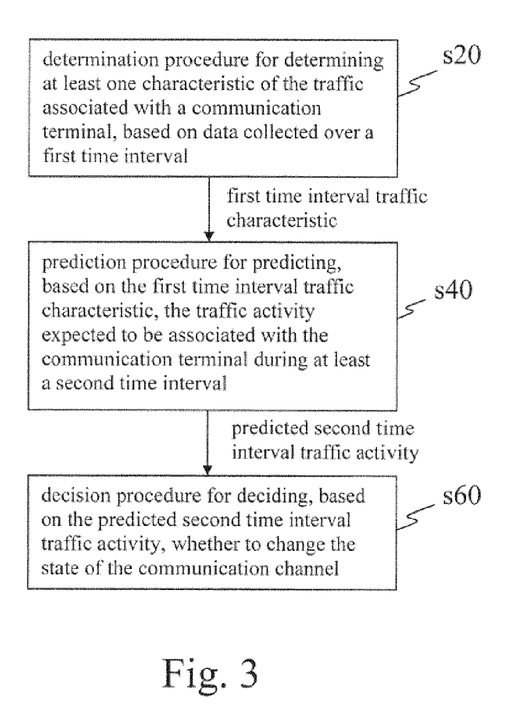
FIG. 3 is a flowchart of a method in one embodiment of the invention.

FIG. 3 is a flowchart of a method in one embodiment of the invention. The method is carried out by a network node for deciding whether to change the state of a communication channel between a network and a communication terminal (such as for example a state as illustrated on FIG. 2 or 5). The network node may for example be, but is not limited to, a radio network controller (RNC), a Node B, a radio access network (RAN) controller, or any other network node in communication with a RNC, a Node B and/or a RAN controller. The communication terminal may be any type of user equipment such as a mobile phone, a smartphone, a laptop, a tablet PC, a wireless sensor, a gaming device, etc. In one embodiment, the communication terminal supports packet-switched applications, such as IP-based applications.

First, in accordance with a determination procedure s20, the network node determines at least one characteristic of the traffic associated with the communication terminal. The determination is based on data collected in at least one point of the telecommunication network over a first time interval of length L. The step, or procedure, of collecting the data over the first time interval need not be performed by the same network node as the one performing the determination procedure s20. The value of L may for example be between 100 and 1000 ms (milliseconds), between 250 and 750 ms, or between 450 and 550 ms. In one embodiment, L is equal to 500 ms. This value has been found to be an advantageous value in the context of typical packet-based applications (such as TCP/IP-based applications). In another embodiment, L is equal to 250 ms. In yet another embodiment, L is equal to 750 ms.

Then, in accordance with a prediction procedure s40, the network node predicts, based on the at least one characteristic (determined during the determination procedure s20), the traffic activity expected to be associated with the communication terminal during a second time interval of length L following the first time interval. The prediction procedure s40 may be any kind of procedure taking advantage of the fact that there are some patterns that can be recognized in the traffic characteristics. In other words, some periodicity can be learnt. For example, particular sequences can be monitored, detected and learnt depending on the type of traffic (emails, file download, peer-to-peer, instant messaging, media playback, social networking, software update, web browsing, etc.). To do so, the prediction procedure s40 may memorize traffic characteristics for any number of previous time intervals and may use this information for the prediction.

Then, in accordance with a decision procedure s60, the network node decides, based on the predicted traffic activity for the second time interval (predicted during the prediction procedure), whether to change the state of the communication channel. The decision procedure s60 may use a static or dynamic decision tree, as will be explained below.

If the network node decides to change the state of the communication channel towards a communication terminal, signalling is triggered which may cause the communication terminal to make further decisions as to whether its internal state should to be changed as well (e.g., switching to some kind of user interface sleep mode).

Figure 4:
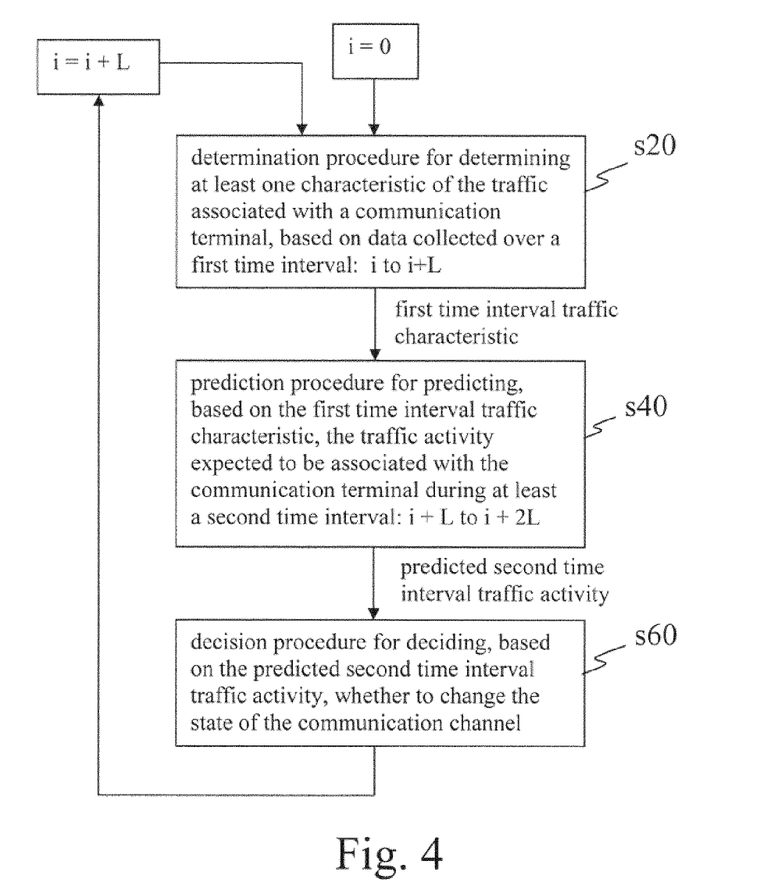
FIG. 4 is a flowchart of a method in one embodiment of the invention, which differs from the flowchart of FIG. 3 in that the repetition of the process is highlighted for successive pairs of time interval.

In one embodiment, as illustrated on FIG. 4, the three procedures s20, s40, s60 may be repeated for another pair of time intervals after decision procedure s60. Whether to do so may depend on the outcome of decision procedure s60 and on the involved state transitions (not illustrated on FIG. 4). In particular, in one embodiment, the three procedures are repeated in the sense that the second time interval of the first iteration (i.e., execution) becomes the first time interval of the second iteration, the third time interval following the second time interval of the first iteration becomes the second interval of the second iteration, and the three procedures are repeated. The repetition process for another pair of time intervals may therefore be regarded as a form of sliding window, wherein, after each execution of the three procedures, the sliding window is moved by L (as schematically illustrated by the box labelled "i=i+L" on FIG. 4).

In other words, in the embodiment illustrated by the flowchart of FIG. 4, the determination procedure s20, the prediction procedure s40 and the decision procedure s60 are repeated for subsequent pairs of first and second time intervals.

As mentioned above with reference to FIG. 3, in accordance with a determination procedure s20, the network node determines at least one characteristic of the traffic associated with the communication terminal. In one embodiment, the at least one characteristic of the traffic associated with the communication terminal comprises at least one of: (i) an indication of the number of packets destined to, or originating from, the communication terminal during the first time interval; (ii) an indication of the number of bytes destined to, or originating from, the communication terminal during the first time interval; (iii) an indication of the number of parallel active flows destined to, or originating from, the communication terminal during the first time interval; (iv) an indication of how long the communication terminal was in active state during the first time interval; (v) an indication of how long the communication terminal was in inactive state during the first time interval; (vi) an indication as to the type of communication(s) ongoing for the communication terminal during the first time interval (such as for example: advertisement, email, file download, instant messaging, media playback, video playback, social networking, software update, web browsing, etc., wherein this may be detected by deep packet inspection, as will be explained below); (vii) an indication as to the services ongoing for the communication terminal during the first time interval; (viii) an indication as to whether a Transmission Control Protocol (TCP) connection was ongoing for the communication terminal during the first time interval; (ix) an indication as to whether a User Datagram Protocol connection (UDP) connection was ongoing for the communication terminal during the first time interval; and (x) an indication as to whether neither a TCP connection nor a UDP connection was ongoing for the communication terminal during the first time interval. Additional traffic characteristics may be used.

As mentioned above with reference to FIG. 3, in accordance with the determination procedure s20, the network node determines at least one characteristic of the traffic associated with the communication terminal and the determination is based on data collected in at least one point of the telecommunication network over a first time interval of length L. In one embodiment, collecting the data (which is subsequently used in the determination procedure s20) comprises inspecting packets received in the at least one point of the telecommunication network by packet inspection.

Packet inspection technology offers two types of analysis, namely shallow packet inspection and deep packet inspection (DPI). Shallow packet inspection extracts basic protocol information, such as IP addresses (source, destination) and other low-level connection states. This extracted information resides in the packet header itself and consequently reveals the principal communication intent. DPI, on the other hand, provides application awareness. This is achieved by analysing the content in both the packet header and the payload over a series of packet transactions. There are several possible methods of analysis used to identify and classify applications and/or protocols that are grouped into signatures. One of these methods deals with heuristic signatures which are related to the behavioural analysis of user traffic.

In one embodiment, collecting the data comprises deep packet inspection (DPI), i.e. inspecting packets received in the at least one point of the telecommunication network by inspecting at least one of: (i) layer n control information of the received packets, wherein n is an integer equal to or larger than 3; and (ii) the received packets' payload encapsulated by layer 7 control information. The layer level is here understood in the sense of the Open Systems Interconnection (OSI) reference model (but may be translated into other reference models).

As mentioned above with reference to FIG. 3, in accordance with the prediction procedure s40, the network node is configured to predict, based on the at least one characteristic (determined in the determination procedure s20), the traffic activity expected to be associated with the communication terminal during a second time interval (of length L). The second time interval follows the first time interval. In one embodiment, the predicted traffic activity comprises at least one of: (i) a predicted burst length after the first time interval, (ii) a predicted silence length after the first time interval, and (iii) a predicted bandwidth expected to be required for the communication terminal during the second time interval. The predicted burst length (item (i)) may be a number of successive time intervals of length L occurring after the first time interval time and during which at least some bytes are expected to be transmitted from or to the communication terminal. The predicted silence length (item (ii)) may be a number of successive time intervals of length L occurring after the first time interval and during which no bytes are expected to be transmitted from or to the communication terminal. The predicted bandwidth (item (iii)) is a number of bytes expected to be transmitted during the second time interval from or to the communication terminal. These three predicted items (i), (ii) and (iii) are particularly suitable as input to the decision procedure s60 since they determine well the appropriateness of a channel switching.

In one embodiment, the prediction procedure s40 always generates a predicted bandwidth, i.e., a number of bytes expected to be transmitted during the second time interval from or to the communication terminal. The decision procedure s60 may then take into account whether the expected bandwidth is above or below a threshold to decide whether to switch the channel state.

In one embodiment, the prediction procedure s40 involves at least one of: a neural network method; an exponential smoothing method; and a Kalman filter-based method. An exemplary neural network process which may be used for the prediction procedure s40 is schematically shown in reference [1], FIG. 14. The inputs and outputs are different however. The neural network process of reference [1], FIG. 14, does not involve any segmentation into time intervals of equal lengths, so that the input values differ. The principles of operation may however be similar. The neural network process of the prediction procedure s40 may be implemented in software, hardware, or a combination of software and hardware. Input features (traffic characteristics as generated by the determination procedure s20) are fed into the neural network process, internal states are changed (based on previous value, input and previous output), and then outputs (based on internal states and input) are available. A recursive neural network (RNN) may be used, which has internal states acting as a kind of memory, storing previous values of the input features.

As mentioned above with reference to FIG. 3, in accordance with decision procedure s60, the network node is configured to decide, based on the predicted traffic activity for the second time interval, whether to change the state of the communication channel. In one embodiment, the decision procedure s60 is further based on the at least one characteristic determined during the determination procedure s20 based on the data collected over the first time interval. This is illustrated by the arrow labelled "basic features (optional)" on FIG. 6, which will be explained later. This enables to refine the decision process used in decision procedure s60.

In one embodiment, decision procedure s60 comprises deciding whether to change the state of the communication channel to a lower energy consuming state, i.e. switching the state of the communication channel to a state enabling the communication terminal to consume less energy. The invention is however not limited to switching the state of the communication channel to such a lower energy state. The decision may also be a decision as to whether the state of the communication channel is to be switched to a state leading to faster or more comfortable service being offered to the user, or as to whether the state of the communication channel is to be switched to a state leading to a lower load on the network, such as for example a lower load on a radio network controller (RNC).

In one embodiment, decision procedure s60 uses a decision tree. For example, it may be a decision tree of the type illustrated in reference [1], page 24, lines 15 to 34. The decision tree may for example be a decision tree commonly applying to all communication terminals, it may be a decision tree commonly applying to all communication terminals of a particular type, or it may be a decision tree applying on a per communication terminal basis. A dynamic decision tree may be used, in the sense that the conditions in the decision tree may be changed. A static decision tree may also be used.

A static decision tree which may be used by decision procedure s60 may look like the following exemplary decision tree, with a simple "if-then-else" code with pre-set values:

```
if (feature1 > limit1)
    if (feature2 > limit2)
        switch=yes
    else
        switch=no
else
    if (feature2 > limit2)
        switch=no
    else
        switch=yes
```

Features 1 and 2 are the input values, while decision procedure s60 is carried out by setting a switch flag (i.e., switch=yes, or switch=no).

In one embodiment, the method further comprises a training procedure for training the decision tree used in decision procedure s60.

Figure 6:
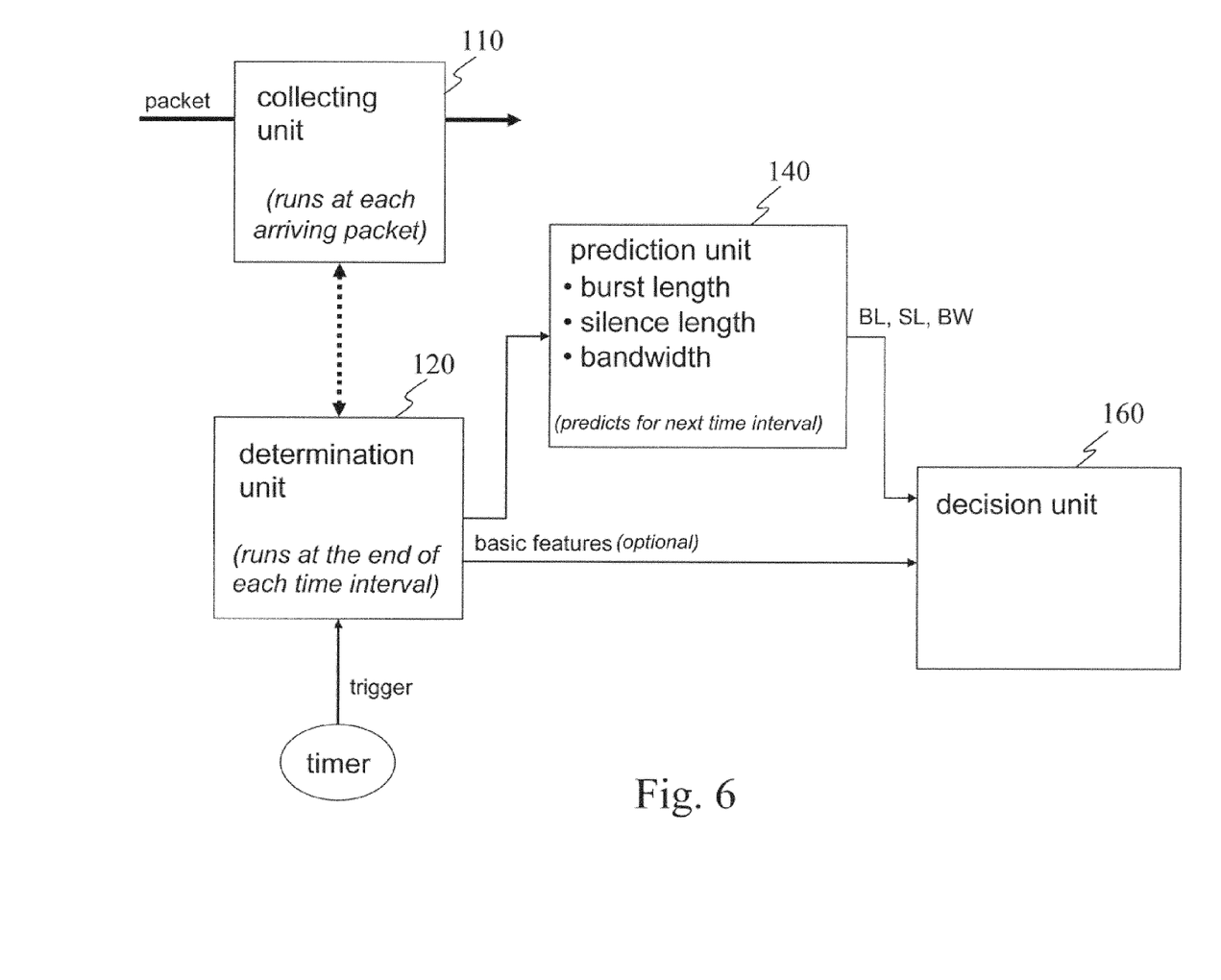
FIG. 6 schematically illustrates a method in one embodiment of the invention, and functional units which may be involved therein.

FIG. 6 schematically illustrates a method in one embodiment of the invention, and the functional units that may be involved therein. Namely, the method is carried out by a collecting unit 110, a determining unit 120, a prediction unit 140, and a decision unit 160.

Collecting unit 110 collects data on the traffic associated with each communication terminal. In collecting unit 100, measurements are made to generate basic data for traffic features (such as for example measuring the number of bytes transmitted, which relate to a particular communication terminal, etc.). Collecting unit 110 may host a DPI engine.

At the end of each time interval (each time interval having a length L equal for example to 500 ms), determination unit 120 starts to compute the traffic characteristics (or features) based on the data collected by collecting unit 110. Determination unit 120 implements the determination procedure s20. This is a parallel activity. Namely, collecting unit 110 does not stop its operation when determination unit 120 is executed. In one embodiment, a timer runs per subscriber so that the time intervals are not synchronized. This enables to avoid bursts of activity in determination unit 120.

When determination unit 120 has completed its execution for the first time interval, the traffic characteristics are sent to prediction unit 140 (which may for example implement a recursive neural network, but other implementations are also possible) and also optionally to decision unit 160. Prediction unit 140, which implements the prediction procedure s40, predicts the traffic activity for the second time interval on a per communication terminal basis: namely the predicted burst length, the predicted silence length and the predicted bandwidth for a particular communication terminal.

Based on the traffic activity for the second time interval as predicted by prediction unit 140 (i.e., predicted burst length, predicted silence length and predicted bandwidth) and, optionally, based on the traffic characteristic directly coming from determination unit 120, a decision is made in decision unit 160 (which may for example implement a dynamic decision tree). Decision unit 160 decides whether the next time interval must be spent in a different channel state, such as, but not limited to, a lower power level state, i.e. whether a channel switch is timely and appropriate.

Figure 7:
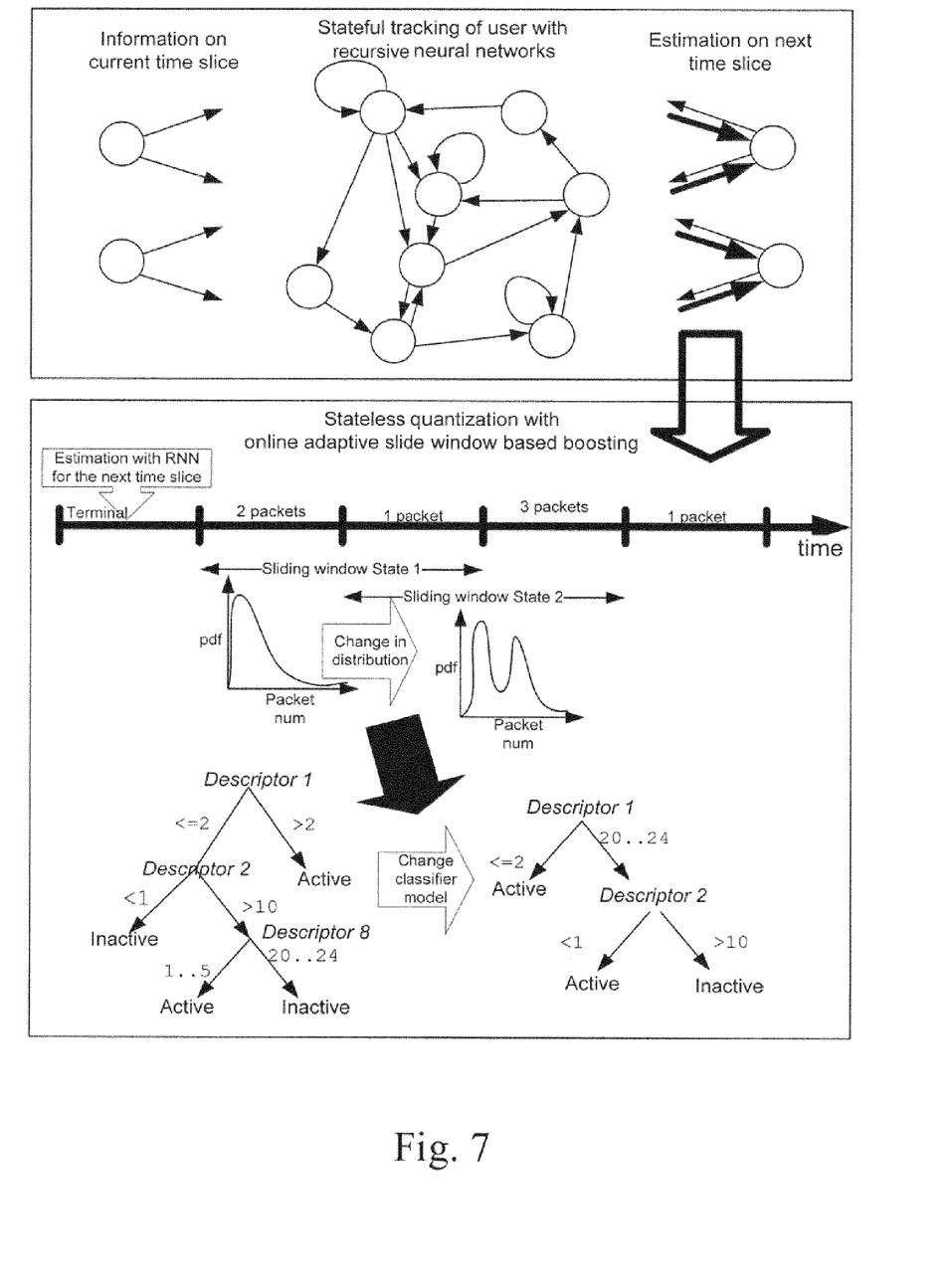
FIG. 7 is a functional diagram illustrating a neural network-based prediction procedure and an adaptive decision procedure of a method in one embodiment of the invention.

FIG. 7 is a diagram schematically illustrating a prediction procedure s40 (higher part of FIG. 7) and a decision procedure s60 (lower part of FIG. 7) according to one embodiment of the invention. In this embodiment, prediction procedure s40 uses a recursive neural network process and decision procedure s60 uses a machine learning process.

As mentioned above, a neural network process may be used for prediction procedure s40. For example, three different neural networks may be used, one for generating the predicted bandwidth for the second time interval, one for generating the predicted burst length, and one for generating the predicted silence length.

As also mentioned above, a machine learning process may be used for decision procedure s60. For a background on machine learning, see for example: Nilsson, N.J., *Introduction to machine learning: An early draft of a proposed text book*, Stanford University, Stanford (Nov. 3, 1998), retrieved on Oct. 14, 2012 from http://robotics.stanford.edu/~nilsson/MLBOOK.pdf. The machine learning process may involve a dynamic decision tree. This decision tree should be trained. In one embodiment, the decision tree is specific to a subscriber. In one embodiment, the decision tree is trained offline, i.e. before the decision procedure s60 implementing that decision tree is actually carried out on the network node. In another embodiment, the decision is trained online, i.e. in parallel to the decision procedure s60 implementing that decision tree. To do so, the output of determination procedure s20 is not only transmitted to prediction procedure s40 but also to the training procedure.

In one embodiment, the training involves simulating a channel state machine and feeding the decision tree accordingly. This approach simulates the effect of regular down-switch timeout, without taking into account (i.e. without feed the training with) a lot of inactive slices when the user gets detached for e.g., half a day. It is advantageous to train the decision tree based on time intervals with a lot of data transfers, rather than based on quiet time intervals. In one embodiment, the training procedure is optimized in that it involves a simulated environment to simulate a communication terminal state machine and in that the training data, i.e. the data on which the training procedure is to be performed, contains no data from long idle periods.

In order to select the data to be used for training the decision tree, the training procedure may determine a reference state of the communication terminal (for use by the training procedure only) by running a conventional inactivity timer-based channel switching state machine. If the communication terminal happens to be in CELL_DCH or CELL_FACH reference state, the communication terminal is treated as "active" and the collected data is saved to the training set. Otherwise, the communication terminal is treated as "inactive", and the data is dropped and is not used for the training procedure. After a certain number of lines of training data (or a certain number of seconds), a new decision tree is formed. This may form the basis for the dynamic decision tree.

Figure 8:
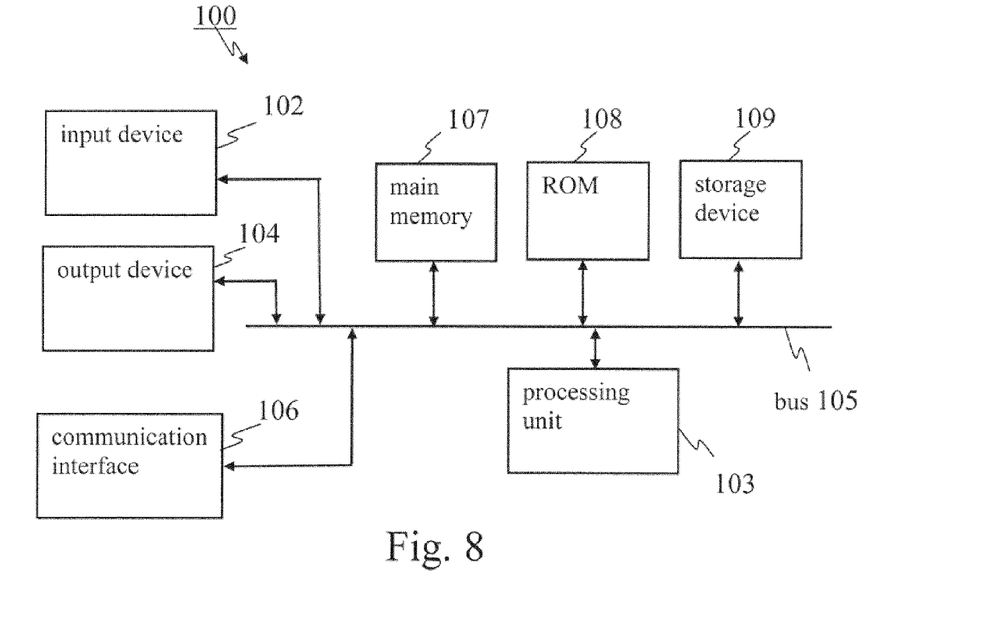
FIG. 8 schematically illustrates a possible implementation of a network node which may be used in one embodiment of the invention.

FIG. 8 is a schematic diagram of an exemplary implementation of a network node 100 that may carry out a method in accordance with embodiments of the invention. As illustrated, network node 100 may include a bus 105, a processing unit 103, a main memory 107, a ROM 108, a storage device 109, an input device 102, an output device 104, and a communication interface 106. Bus 105 may include a path that permits communication among the components of network node 100.

Processing unit 103 may include a processor, a microprocessor, or processing logic that may interpret and execute instructions. Main memory 107 may include a RAM or another type of dynamic storage device that may store information and instructions for execution by processing unit 103. ROM 108 may include a ROM device or another type of static storage device that may store static information and instructions for use by processing unit 103. Storage device 109 may include a magnetic and/or optical recording medium and its corresponding drive.

Input device 102 may include a mechanism that permits an operator to input information to network node 100, such as a keypad, a keyboard, a mouse, a pen, voice recognition and/or biometric mechanisms, etc. Output device 104 may include a mechanism that outputs information to the operator, including a display, a printer, a speaker, etc. Communication interface 106 may include any transceiver-like mechanism that enables network node 100 to communicate with other devices and/or systems. For example, communication interface 106 may include mechanisms for communicating with another device or system via a network.

Network node 100 may perform certain operations or processes described herein. These operations may be performed in response to processing unit 103 executing software instructions contained in a computer-readable medium, such as main memory 107, ROM 108, and/or storage device 109. A computer-readable medium may be defined as a physical or a logical memory device. For example, a logical memory device may include memory space within a single physical memory device or distributed across multiple physical memory devices. Each of main memory 107, ROM 108 and storage device 109 may include computer-readable media. The magnetic and/or optical recording media (e.g., readable CDs or DVDs) of storage device 109 may also include computer-readable media. The software instructions may be read into main memory 107 from another computer-readable medium, such as storage device 109, or from another device via communication interface 106.

The software instructions contained in main memory 109 may cause processing unit 103 to perform operations or processes described herein, such as, but not limited to, a determination procedure s20, a prediction procedure s40 and/or a decision procedure s60. Alternatively, hardwired circuitry may be used in place of or in combination with software instructions to implement processes and/or operations described herein. Thus, implementations described herein are not limited to any specific combination of hardware and software.

Figure 9:
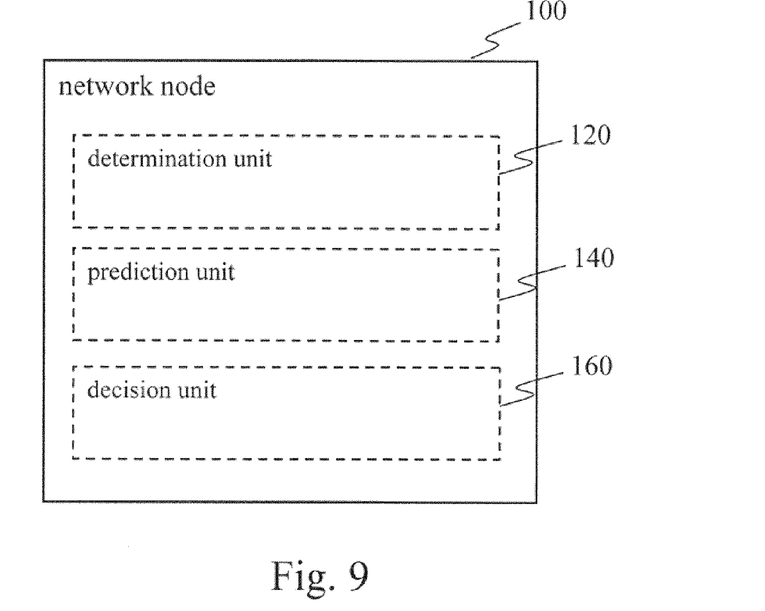
FIG. 9 schematically illustrates a network node in one embodiment of the invention.

FIG. 9 schematically illustrates functional units of a network node 100 according to one embodiment of the invention. The network node illustrated on FIG. 9 may for example be implemented as illustrated on FIG. 8.

Network node 100 comprises a first unit 120, a second unit 140 and a third unit 160, hereinafter referred to as "determination unit", "prediction unit", and "decision unit" respectively.

Determination unit 120 is configured for determining at east one characteristic of the traffic associated with a communication terminal, based on data collected in at least one point of the telecommunication network over a first time interval of length L, equal for example to 500 ms. A collecting unit, which may be provided with a DPI engine, may also be hosted in network node 100 (not illustrated on FIG. 9). The collecting unit may alternatively be hosted on another network node.

Prediction unit 140 is configured for predicting, based on the at least one characteristic, the traffic activity expected to be associated with the communication terminal during at least a second time interval of length L. The second time interval follows the first time interval. Prediction unit 140 may implement a neural network process or any other history-based prediction process.

Decision unit 160 is configured for deciding, based on the predicted traffic activity for the second time interval, whether to change the state of the communication channel. The actual procedures for switching the channel state may be performed by network node 100 or another network node (or plurality of network nodes) in communication with network node 100. Decision unit 160 may integrate a static or dynamic decision tree.

In one embodiment, the functions of the determination unit 120, the prediction unit 140 and the decision unit 160 are distributed over a set of network nodes (not illustrated in the drawings), rather than hosted on a single network node 100.

Where the term "determination unit", "prediction unit", "decision unit", "training unit" and "collecting unit" are used herewith, no restriction is made regarding how distributed this element may be and regarding how gathered elements may be. That is, the constituent elements of a unit may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, the above-mentioned and/or claimed determination unit, prediction unit, decision unit, training unit and collecting unit are replaced by determination means, prediction means, decision means, training means and collecting means respectively for performing the functions of the determination unit, prediction unit, decision unit, training unit and collecting unit.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method carried out by at least one network node of a telecommunication network to change a state of a communication channel between a communication terminal and the telecommunication network, the method comprising:
    a first determination procedure comprising determining at least one characteristic of the traffic associated with the communication terminal, based on data collected in at least one point of the telecommunication network over a first time interval of length L;
    a second prediction procedure comprising predicting, based on the at least one characteristic, the traffic activity expected to be associated with the communication terminal during at least another second time interval of length L, wherein the second time interval follows the first time interval; and
    triggering a signal to affect a change in the state of the communication channel based on a third decision procedure, wherein the third decision procedure comprises deciding, based on the predicted traffic activity for the second time interval, whether to change the state of the communication channel.

2. The method of claim 1, wherein the determination procedure, the prediction procedure and the decision procedure are repeated for subsequent pairs of first and second time intervals.

3. The method of claim 1, wherein the at least one characteristic of the traffic associated with the communication terminal comprises at least one of:
   an indication of the number of packets destined to, or originating from, the communication terminal during the first time interval;
   an indication of the number of bytes destined to, or originating from, the communication terminal during the first time interval;
   an indication of the number of parallel active flows destined to, or originating from, the communication terminal during the first time interval;
   an indication of how long the communication terminal was in active state during the first time interval;
   an indication of how long the communication terminal was in inactive state during the first time interval;
   an indication as to the type of communication(s) ongoing for the communication terminal during the first time interval;
   an indication as to the services ongoing for the communication terminal during the first time interval;
   an indication as to whether a Transmission Control Protocol (TCP) connection was ongoing for the communication terminal during the first time interval;
   an indication as to whether a User Datagram Protocol (UDP) connection was ongoing for the communication terminal during the first time interval; and
   an indication as to whether neither a TCP connection nor a UDP connection was ongoing for the communication terminal during the first time interval.

4. The method according to claim 1, further comprising:
   collecting the data which is subsequently used in the determination procedure, wherein the collecting comprises inspecting packets received in the at least one point of the telecommunication network by inspecting at least one of:
      layer n control information of the received packets, wherein n is an integer equal to or larger than 3; and
      the received packets' payload encapsulated by layer 7 control information;
      wherein the layer level refers to the Open Systems Interconnection (OSI) reference model.

5. The method according to claim 1, wherein L has a value between at least one of:
   (i) 100 and 1000 ms;
   (ii) 250 and 750 ms; and
   (iii) 450 and 550 ms.

6. The method according to claim 1, wherein the predicted traffic activity comprises at least one of:
   a predicted burst length after the first time interval;
   a predicted silence length after the first time interval; and
   a predicted bandwidth expected to be required for the communication terminal during the second time interval.

7. The method of claim 6, wherein the predicted burst length is a number of successive time intervals of length L occurring after the first time interval time and during which at least some bytes are expected to be transmitted.

8. The method of claim 6, wherein the predicted silence length is a number of successive time intervals of length L occurring after the first time interval and during which no bytes are expected to be transmitted.

9. The method according to claim 6, wherein the predicted bandwidth is a number of bytes expected to be transmitted during the second time interval.

10. The method according to claim 1, wherein the prediction procedure involves at least one of:
    a neural network method;
    an exponential smoothing method; and
    a Kalman filter based method.

11. The method according to claim 1, wherein the decision procedure is further based on the at least one characteristic determined during the determination procedure based on the data collected over the first time interval.

12. The method according to claim 1, wherein the decision procedure comprises deciding whether to change the state of the communication channel to a lower energy consuming state.

13. The method according to claim 1, wherein the decision procedure uses a decision tree.

14. The method of claim 13, further including:
    a training procedure for training the decision tree used in the decision procedure.

15. The method of claim 14, wherein the training procedure involves a simulated environment to simulate the state machine of the communication terminal.

16. The method according to claim 13, wherein the decision tree is a decision tree commonly applying to all communication terminals.

17. A non-transitory computer readable storage medium comprising computer executable instructions that, when carried out on a computer, causes the computer to execute the method according to claim 1.

18. A network node or set of network nodes of a telecommunication network for changing a state of a communication channel between a communication terminal and the telecommunication network, the network node or each of the set of network nodes comprising:
    one or more processors configured for:
       determining at least one characteristic of the traffic associated with the communication terminal, based on data collected in at least one point of the telecommunication network over a first time interval of length L;
       predicting, based on the at least one characteristic, the traffic activity expected to be associated with the communication terminal during at least another second time interval of length L, wherein the second time interval follows the first time interval; and
       deciding, based on the predicted traffic activity for the second time interval, whether to change the state of the communication channel; and
       triggering a signal to affect a change in the state of the communication channel based on the deciding.

19. The network node or the set of network nodes according to claim 18, wherein the network node or the set of network nodes being configured to repeat the operations of the one or more processors for subsequent pairs of first and second time intervals.

20. The network node or the set of network nodes according to claim 18, wherein the at least one characteristic of the traffic associated with the communication terminal comprises at least one of:
    an indication of the number of packets destined to, or originating from, the communication terminal during the first time interval;

an indication of the number of bytes destened to, or originating from, the communication terminal during the first time interval;
an indication of the number of parallel active flows destened to, or originating from, the communication terminal during the first time interval;
an indication of how long the communication terminal was in active state during the first time interval;
an indication of how long the communication terminal was in inactive state during the first time interval;
an indication as to the type of communication(s) ongoing for the communication terminal during the first time interval;
an indication as to the services ongoing for the communication terminal during the first time interval;
an indication as to whether a Transmission Control Protocol (TCP) connection was ongoing for the communication terminal during the first time interval;
an indication as to whether a User Datagram Protocol (UDP) connection was ongoing for the communication terminal during the first time interval; and
an indication as to whether neither a TCP connection nor a UDP connection was ongoing for the communication terminal during the first time interval.

21. The network node or the set of network nodes according to claim 18, wherein the network node or the set of network nodes being further configured for:
collecting the data which is subsequently used by the one or more processors, wherein the collecting comprises inspecting packets received in the at least one point of the telecommunication network by inspecting at least one of:
layer n control information of the received packets, wherein n is an integer equal to or larger than 3; and
the received packets' payload encapsulated by layer 7 control information;
wherein the layer level refers to the Open Systems Interconnection (OSI) reference model.

22. The network node or the set of network nodes according to claim 18, wherein L has a value between at least one of:
(i) 100 and 1000 ms;
(ii) 250 and 750 ms; and
(iii) 450 and 550 ms.

23. The network node or the set of network nodes according to claim 18, wherein the predicted traffic activity comprises at least one of:

a predicted burst length after the first time interval;
a predicted silence length after the first time interval; and
a predicted bandwidth expected to be required for the communication terminal during the second time interval.

24. The network node or the set of network nodes according to claim 23, wherein the predicted burst length is a number of successive time intervals of length L occurring after the first time interval time and during which at least some bytes are expected to be transmitted.

25. The network node or the set of network nodes according to claim 23, wherein the predicted silence length is a number of successive time intervals of length L occurring after the first time interval and during which no bytes are expected to be transmitted.

26. The network node or the set of network nodes according to claim 23, wherein the predicted bandwidth is a number of bytes expected to be transmitted during the second time interval.

27. The network node or the set of network nodes according to claim 18, wherein the one or more processors are configured to execute at least one of:
a neural network method;
an exponential smoothing method; and
a Kalman filter based method.

28. The network node or the set of network nodes according to claim 18, wherein the one or more processors are further configured to decide based on the at least one characteristic determined by the determination unit based on the data collected over the first time interval.

29. The network node or the set of network nodes according to claim 18, wherein the one or more processors are further configured for deciding whether to change the state of the communication channel to a lower energy consuming state.

30. The network node or the set of network nodes according to claim 18, wherein the one or more processors uses a decision tree.

31. The network node or the set of network nodes according to claim 30, wherein the one or more processors are further configured for training the decision tree.

32. The network node or the set of network nodes according to claim 31, wherein the one or more processors execute a simulated environment to simulate the state machine of the communication terminal.

33. The network node or the set of network nodes according to claim 30, wherein the decision tree is a decision tree commonly applying to all communication terminals.

* * * * *